United States Patent
Yoo et al.

(10) Patent No.: US 7,821,523 B2
(45) Date of Patent: Oct. 26, 2010

(54) IMAGE DISPLAY AND STORAGE APPARATUS, METHOD AND MEDIUM

(75) Inventors: Byung-in Yoo, Yongin-si (KR); Sung-guy Choi, Yongin-si (KR); Seong-woon Kim, Yongin-si (KR); Nam-woo Kim, Yongin-si (KR); Kwon Ju Yi, Yongin-si (KR); Yill-myung Yim, Yongin-si (KR); Yeun-bae Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 408 days.

(21) Appl. No.: 11/706,987

(22) Filed: Feb. 16, 2007

(65) Prior Publication Data
US 2007/0211072 A1   Sep. 13, 2007

Related U.S. Application Data

(60) Provisional application No. 60/780,353, filed on Mar. 9, 2006.

(30) Foreign Application Priority Data
Aug. 28, 2006   (KR)   ............... 10-2006-0081836

(51) Int. Cl.
*G09G 5/00* (2006.01)
*G09G 5/02* (2006.01)
*G06K 9/00* (2006.01)
*G06K 9/40* (2006.01)
*G06K 9/60* (2006.01)
*G06F 3/00* (2006.01)
*G06F 3/048* (2006.01)
*G06K 9/36* (2006.01)

(52) U.S. Cl. ............. 345/600; 345/581; 345/428; 345/589; 345/619; 382/166; 382/305; 382/254; 382/276; 715/700; 715/800; 715/815; 715/838

(58) Field of Classification Search ............... 345/428, 345/581, 589, 593–594, 600, 601, 618–619, 345/629–630, 635, 549; 382/166–167, 232, 382/254, 276, 305; 715/700, 800, 763–764, 715/815, 838
See application file for complete search history.

(56) References Cited

U.S. PATENT DOCUMENTS
5,914,676 A   6/1999   Akpa
(Continued)

FOREIGN PATENT DOCUMENTS
JP   2005-303728   10/2005
JP   2005-328243   11/2005

OTHER PUBLICATIONS

PCT Notification of Transmittal of the International Search Report and the Written Opinion of the International Searching Authority, or the Declaration for corresponding International application no. PCT/KR2007/001069 dated June 8, 2007 (In English).
Details: Apple files major chameleonic iPod touch display patent, Oct. 26, 2006, http://www.macnn.com/blogs/?p=136 (9 pgs) (in English).

*Primary Examiner*—Wesner Sajous
(74) *Attorney, Agent, or Firm*—Staas & Halsey LLP

(57) ABSTRACT

An image display and storage device, method, and medium to process an original image and generate a main image so that the original image does not overlap a sub image, and store the original image instead of the main image when the main image and the sub image are displayed. The device includes an image processor to receive an image, and to generate a display image and a storage image using the received image, a display unit to receive the display image from the image processor, and to display the display image, and an image storing unit to receive the storage image from the image processor and to store the image.

32 Claims, 7 Drawing Sheets

U.S. PATENT DOCUMENTS

| | | |
|---|---|---|
| 6,256,020 B1 | 7/2001 | Pabon et al. |
| 6,628,417 B1* | 9/2003 | Naito et al. ................ 358/1.15 |
| 6,798,359 B1 | 9/2004 | Ivancic |
| 6,879,342 B1 | 4/2005 | Miller et al. |
| 2005/0088684 A1* | 4/2005 | Naito et al. ................ 358/1.15 |
| 2005/0140802 A1* | 6/2005 | Nam .......................... 348/239 |
| 2005/0163402 A1* | 7/2005 | Aiso .......................... 382/300 |
| 2006/0197753 A1 | 9/2006 | Hotelling |
| 2006/0209203 A1* | 9/2006 | Son et al. ............... 348/333.11 |
| 2006/0238517 A1 | 10/2006 | King et al. |
| 2006/0250506 A1* | 11/2006 | Lee et al. ................. 348/222.1 |
| 2007/0126908 A1* | 6/2007 | Kim ...................... 348/333.01 |
| 2009/0033752 A1* | 2/2009 | Bodnar et al. ............ 348/211.3 |

* cited by examiner

IMAGE DISPLAY AND STORAGE APPARATUS, METHOD AND MEDIUM

CROSS-REFERENCE TO RELATED APPLICATIONS

This application claims the benefits of U.S. patent application Ser. No. 60/780,353, filed on Mar. 9, 2006, in the United States Patents and Trademark Office, and Korean Patent Application No. 10-2006-0081836, filed on Aug. 28, 2006, in the Korean Intellectual Property Office, the disclosures of which are incorporated herein in their entirety by reference.

BACKGROUND

1. Field

An embodiment of the present invention relates to image display and storage, and more particularly, to an image display and storage method performed by a terminal which is capable of displaying and storing images.

2. Description of the Related Art

Terminals, such as camcorders and digital cameras, display an image captured through a lens on a liquid crystal panel included in the terminals. A user of such a terminal finds an image which he or she wants to photograph while viewing the liquid crystal panel, and photographs the image which is currently displayed on the liquid crystal panel. The photographed image is stored in the terminal.

Meanwhile, an image or symbol for allowing the user to manipulate the terminal, i.e. a display symbol, can be displayed on the liquid crystal panel along with an image captured through the terminal lens. For example, the liquid crystal panel can display one or more symbols to indicate battery charge, to set zoom-in or zoom-out, to indicate time, or any other terminal operation.

Generally, an image captured through a lens is displayed on the entire area of a liquid crystal panel. Often, a display symbol will be displayed in such a way so as to overlap and obscure part of the image captured through the lens. This overlap of the lens image by the display symbols can be annoying to a user who is indifferent to the indications provided by the display symbols.

In order to resolve this problem, a method for reducing the display size of an image captured through a lens and displaying a display symbol without overlapping and obscuring the image captured through the lens is desired. Conventional methods of reducing the display size of an image captured through a lens can result in image distortion. Accordingly, a method for removing this problem is also desired.

SUMMARY

One or more embodiments of the present invention provide an image display and storage apparatus, method, and medium to process an original image and generate a main image for display so that the original image does not overlap a sub image that would overlap the original image, and stores the original image instead of the main image when the main image and the sub image are displayed.

Additional aspects and/or advantages of the invention will be set forth in part in the description which follows and, in part, will be apparent from the description, or may be learned by practice of the invention.

To achieve at least the above and/or other aspects and advantages, embodiments of the present invention include an image display and storage device. The device includes an image processor to receive an image and to generate a display image and a storage image using the received image, a display unit to receive the display image from the image processor, and to display the display image, and an image storing unit to receive the storage image from the image processor and to store the storage image.

To achieve at least the above and/or other aspects and advantages, embodiments of the present invention include an image display and storage device. The device includes an image processor to generate a main image to be displayed without overlapping a sub image by processing an original image which would overlap the sub image when displayed, a display unit to display the main image and the sub image together, and a photographed image storing unit to store the original image.

To achieve at least the above and/or other aspects and advantages, embodiments of the present invention include a display and storage method performed by a terminal including generating a display image and a storage image based on an original image, the display image and the storage image being generated with a different image characteristic, and selectively displaying and storing the display image and the storage image, respectively.

To achieve at least the above and/or other aspects and advantages, embodiments of the present invention include an image display and storage method including generating a main image to be displayed without overlapping a sub image by processing an original image which would overlap the sub-image when displayed, displaying the main image and the sub image together without overlap, and storing the original image.

To achieve at least the above and/or other aspects and advantages, embodiments of the present invention include an image display and storage method performed by a terminal including generating a main image which is displayed without overlapping a sub image by processing an original image which is capable of overlapping the sub image, displaying the main image and the sub image together, determining whether the terminal is in a photography mode, and selectively storing the original image based on the terminal being in a photography mode.

To achieve at least the above and/or other aspects and advantages, embodiments of the present invention include an image display and storage method performed by a terminal including determining whether the terminal is in one of a preview mode and a photography mode, generating a main image which is to be displayed without overlapping a sub image by processing an original image which would overlap the sub image when displayed, based on the terminal being in a preview mode, and storing the thumbnail image and the original image based on the terminal being in a photography mode.

To achieve at least the above and/or other aspects and advantages, embodiments of the present invention include an image display and storage device. The device includes an image processor to generate a display image and a storage image from an original image, the display image and the storage image being generated with a different image characteristic a display unit to display the display image, and an image storing unit to store the storage image.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
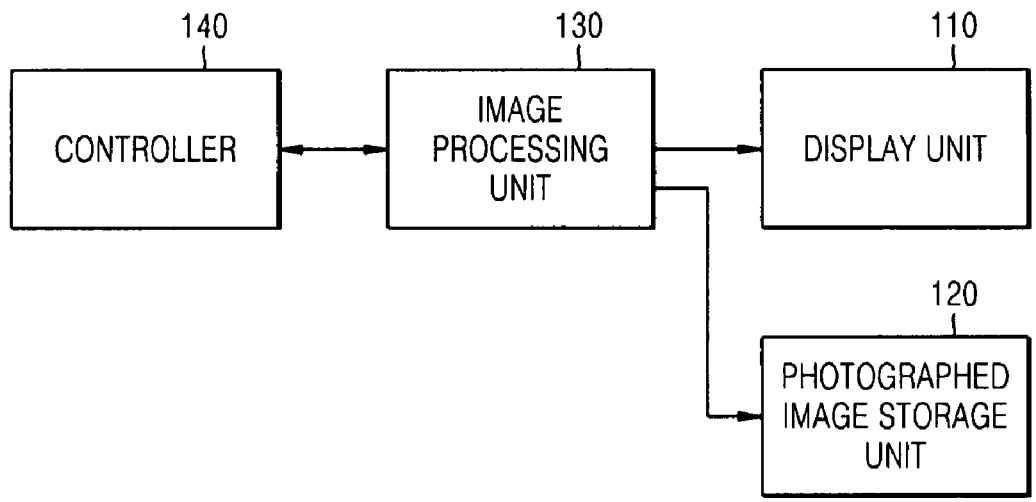
FIG. 1 illustrates an image display and storage apparatus, according to one or more embodiments of the present invention.

Reference will now be made in detail to embodiments of the present invention, examples of which are illustrated in the accompanying drawings, wherein like reference numerals refer to the like elements throughout. It should be noted that the present invention may be embodied in many different forms/ways and should not be construed as being limited to embodiments set forth herein. Embodiments are described below to explain the present invention by referring to the figures.

FIG. 1 illustrates an image display and storage apparatus, according to one or more embodiments of the present invention. Referring to FIG. 1, the image display and storage apparatus includes a display unit 110, a photographed image storage unit 120, an image processing unit 130, and a controller 140, for example.

The image display and storage apparatus may be a terminal, such as a camcorder or a digital camera, which is capable of displaying, photography, and storing images. In one embodiment, the image display and storage apparatus is a camcorder, and in another embodiment, the image display and storage apparatus may be a digital camera.

The display unit 110 can be implemented by at least one display panel, and images are displayed through the display panel. For convenience of description, it is assumed that the display unit 110 is a display panel (having horizontal length=a [cm], and having vertical length=b [cm], wherein a>b), noting that alternative embodiments are equally available. The display panel can include a main display area (not shown) and a button or symbol display area (not shown), however, again embodiments of the present invention are not limited thereto. As illustrated in FIG. 10B, for example, a reference number 1000 denotes the display panel, a reference number 1025 denotes the main display area, and a reference number 1035 denotes the button or symbol display area.

The photographed image storage unit 120 stores a photographed image.

The image processor 130 receives an image, and generates at least one of a display image and a storage image using the received image.

The image processing unit 130 outputs the display image to the display unit 110, and outputs the storage image to the photographed image storage unit 120.

The operation of the image processor 130 will now be described below in more detail.

The image processing unit 130 can include at least one lens and a sensor for sensing light incident through the lens, for example. The sensor may be a photoelectric sensor such as a Charge-Coupled Device (CCD) sensor, or any type of light detecting sensor. The image processor 130 acquires an image (hereinafter referred to as an original image) captured through the lens. For the convenience of description, it is assumed that a ratio (a/b) of a horizontal length and a vertical length of the original image is equal to a ratio (a/b) of a horizontal length and a vertical length of the display panel, and the original image is displayed on the entire area of the display panel, again, noting that embodiments of the present invention are not limited thereto. A ratio (a/b) of a horizontal length and a vertical length will be referred to hereinafter as the aspect ratio.

The image processing unit 130 processes the original image, which when displayed will often be overlapped by a sub image, and instead generates a main image, which will be displayed without being overlapped by the sub image.

Here, the sub image is an image or symbol providing information allowing the user to manipulate the image display and storage device, for example. The sub image may include one or more of a symbol for setting zoom-in or zoom-out, a symbol for setting on/off of a flash, a symbol for setting the camera f-stop, a symbol indicating battery capacity, or a symbol representing any other device operation. The display unit 110 can either permanently display the sub image, or can display the sub image only upon user command, or other reasons, for example. The size of the sub image, which is displayed on the display panel, depends on its content. For example, if the sub image is a sentence such as "the battery is low", the sub image may be displayed over half (a horizontal length=a/2 [cm], a vertical length=b [cm]) of the display panel. If the sub image is a figure indicating the remaining capacity of the battery, the sub image may only be displayed on a ¼ the area (a horizontal length a/2 [cm], a vertical length b/2 [cm]) of the display panel. If the sub image is a symbol for setting zoom-in or zoom-out, a symbol for setting on/off of a flash, or a symbol for setting the camera f-stop, the sub image may again only be displayed on a ¼ area (a horizontal length=a/4 [cm], a vertical length b [cm]) of the display panel. It is also possible to maintain the size of the sub image displayed on the display panel constant, regardless of the content of the sub image. The sub image may be displayed on the upper portion, the lower portion, the left portion, the right portion, or the center portion of the display panel. In addition, multiple sub images may be displayed at one time.

As described above, if the original image is displayed on the entire area of the display panel, the original image would overlap with the sub image. This overlap of the lens image by the display symbols can be annoying to a user who is indifferent to the indications provided by the display symbols, particularly, to a user who desires an unfettered view of the original image.

In order to resolve this and other problems, the image processing unit 130 reviews an image characteristic of the original image, and generates a main image that may be displayed without overlapping the sub image. An image characteristic, as referred to herein, may include without limitation, an image size or an image aspect ratio. Thus, here the image processing unit 130 changes an image characteristic by reducing the size of the original image to generate a main image which is displayed without overlapping the sub image. Alternatively, the image processing unit 130 can change an image characteristic by changing the aspect ratio of the original image. Preferably, the image processing unit 130 may generate the main image, while taking into consideration the display size of the sub image. If the display size of the original image is "a horizontal length=a [cm], a vertical length=b [cm]", and the display size of the sub image is "a horizontal length a/4 [cm], a vertical length=b [cm]", the image processing unit 130 can generate, for example, a main image having "a vertical length=3a/4 [cm], a vertical length=b [cm]". In this case, the main image may be obtained by distorting the original image in a horizontal direction.

If the main image is generated by the image processing unit 130, the display unit 110 displays the main image and the sub image together. Although the main image is a distorted image of the original image, a user can still recognize the original image without difficulty.

While the display unit 110 displays the main image and the sub image together, if the user finds an original image which he or she wants to photograph and uses the image display and storage device to photograph the original image, the photographed image storage unit 120 stores the original image rather than the main image.

The controller 140 may control the operation of at least one of the display unit 110, the photographed image storage unit 120, and the image processing unit 130. For example, if the image display and storage device is set to a preview mode, the controller 140 may control the image processing unit 130 to generate a display image and control the operation of the display unit 110. Likewise, if the image display and storage device is set to a photography mode, the controller 140 directs the image processor 130 to generate a display image and a storage image and directs the operation of the display unit 110 and the photography image storage unit 120.

Figure 2:
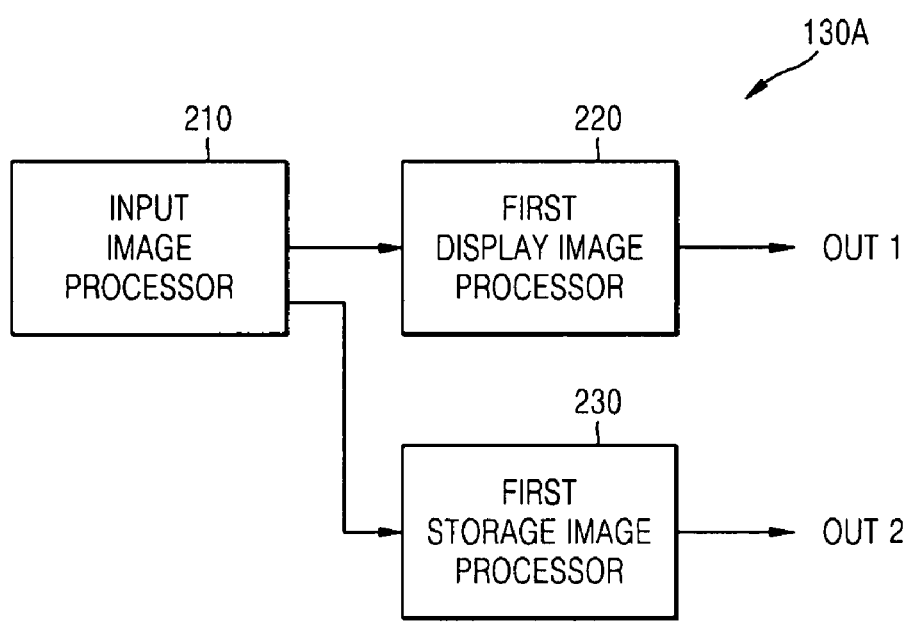
FIG. 2 illustrates an image processing unit, such as that illustrated in FIG. 1, according to one or more embodiments of the present invention.

FIG. 2 illustrates an image processing unit 130A, such as the image processor unit, illustrated in FIG. 1, according to one or more embodiments of the present invention. The image processing unit 130A may include an input image processor 210, a first display image processor 220, and a first storage image processor 230, for example.

The input image processor 210 receives an image, adjusts at least one of the colors and/or the number of pixels of the input image, and outputs the adjusted image to the first display image processor 220 and the first storage image processor 230.

The first display image processor 220 may receive the adjusted image from the input image processor 210, convert an aspect ratio of the adjusted image, generate a main image, combine the main image with a sub image, generate a display image, and output the display image to the display unit 110 through an output terminal OUT1, for example. Here, the main image of the display image may be displayed on a main display area (not shown) of a display panel, and the sub image of the display image is displayed on a button display area (not shown) of the display panel. However, embodiments of the invention are not limited to this embodiment.

The first storage image processor 230 may receive the adjusted image from the input image processor 210, compression-encode the adjusted image, generate a storage image, and output the storage image to the photographed image storage unit 120 through an output terminal OUT2, for example.

Meanwhile, if the image display and storage device is set to the preview mode, the input image processor 210, the first display image processor 220, and the display unit 110 may selectively operate. If the image display and storage device is set to the photography mode, the input image processor 210, the first display image processor 220, the first storage image processor 230, the display unit 110, and the photographed image storage unit 120 may selectively operate.

Figure 3:
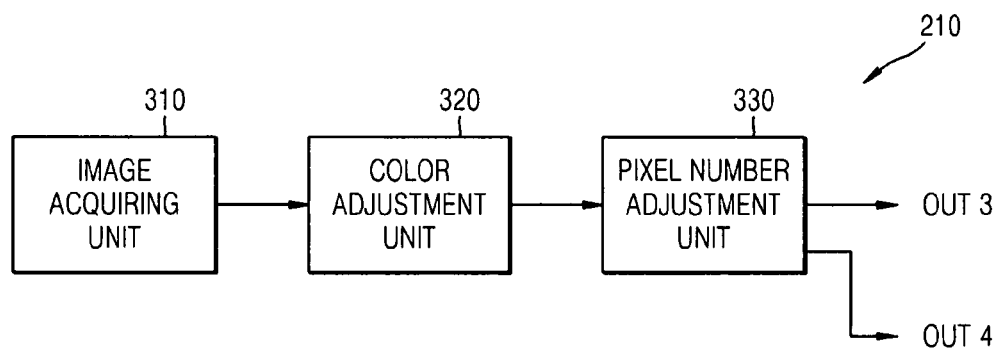
FIG. 3 illustrates an input image processor, such as that illustrated in FIG. 2, according to one or more embodiments of the present invention.

FIG. 3 illustrates an input image processor 210, such as that illustrated in FIG. 2, according to an embodiment of the present invention. The input image processor 210 may include an image acquiring unit 310, a color adjustment unit 320, and a pixel number adjustment unit 330, for example.

The image acquiring unit 310 may include at least one lens and a sensor for sensing light incident through the lens, with the sensor potentially being a photoelectric sensor such as CCD, or any type of light detecting sensor. Accordingly, the image acquiring unit 310 acquires an image.

The color adjustment unit 320 adjusts the color of an original image received from the image acquiring unit 310. In detail, the color adjustment unit 320 may perform at least one of auto exposure, auto white balance, auto focus, color and color processing, or any other color adjustment procedure, on the original image received from the image acquiring unit 310. Here, the color adjustment unit 320 may receive and/or output the original image in a format of a movie stream, although other image formats may be used.

The pixel number adjustment unit 330 adjusts the number of pixels making up the original image, whose color is adjusted by the color adjustment unit 320, and outputs the adjusted result to the first display image processor 220 through an output terminal OUT3 or outputs the adjustment result to the first storage image processor 230 through an output terminal OUT4. For example, the pixel number adjustment unit 330 may convert the original image, whose color is adjusted, into a format based on any video display standard, such as a Video Graphics Array (VGA) specification (640*480 pixels; 640 pixels in a horizontal direction and 480 pixels in a vertical direction). Other video display standards may also be used including, but not limited to, SVGA, XGA, SXGA, UXGA, QXGA, QSXGA, WXGA, WUXGA, or WSXGA. Meanwhile, the pixel number adjustment unit 330 can adjust the number of pixels making up the original image, whose color is adjusted, according to an operating mode of the image display and storage device. Also, the pixel number adjustment unit 330 may output the image whose pixel number is adjusted, to a first image memory (not shown) of the photographed image storage unit 120 with the first image memory storing the adjusted result.

Meanwhile, the input image processor 210 may also omit at least one of the color adjustment unit 320 and the pixel number adjustment unit 330. For example and for the convenience of description, in FIG. 4, it is assumed that the input image processor 210 includes neither the color adjustment unit 320 nor the pixel number adjustment unit 330. In this case, the image output to the first display image processor 220 through the output terminal OUT3 is the original image, and an image outputted to the first storage image processor 230 through an output terminal OUT4 is also the original image.

Figure 4:
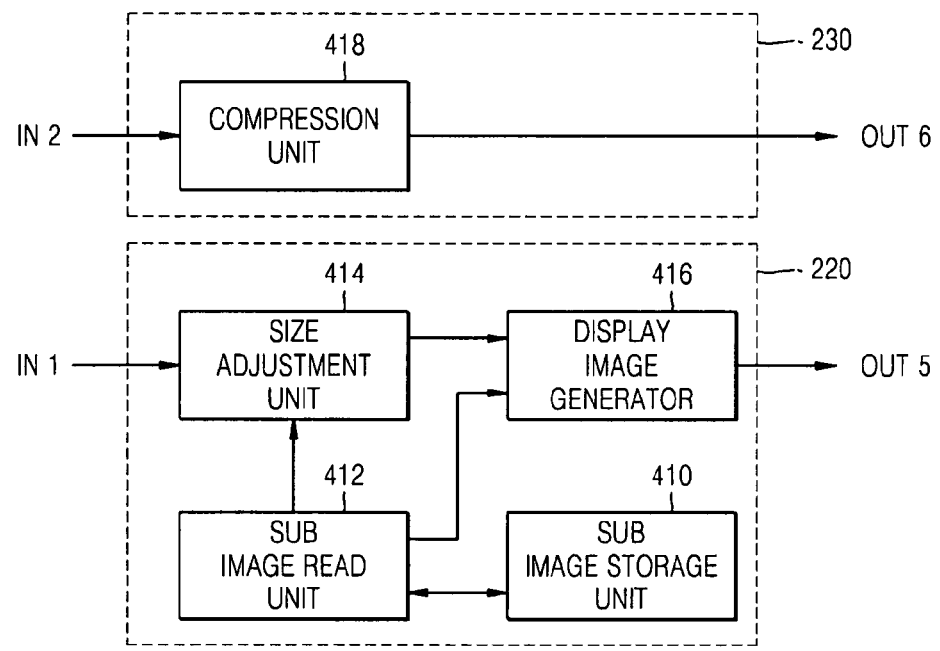
FIG. 4 illustrates a first display image processor and a first storage image processor, such as that illustrated in FIG. 2, according to one or more embodiments of the present invention.

FIG. 4 illustrates the display image processor 220 and the first storage image processor 230, such as illustrated in FIG. 2. The first display image processor 220 and the first storage image processor 230 may include a sub image storage unit 410, a sub image read unit 412, a size adjustment unit 414, a display image generator 416, and a compression unit 418, for example.

The sub image storage unit 410, the sub image read unit 412, the size adjustment unit 414, and the display image generator 416 may, thus, belong to the first display image processor 220, and the compression unit 418 may belong to the first storage image processor 230, for example.

Here, the sub image storage unit 410 stores various sub images that can be displayed on the display unit 110, and the image display and storage device may include a plurality of corresponding keys that can be manipulated by a user for selection of the corresponding symbols. In an embodiment, a sub image, or display symbol, displayed on the display unit 110 varies according to a key manipulation result. That is, the sub image storage unit 410 stores sub images according to key manipulation results, and the sub image read unit 412 reads a sub image corresponding to a key manipulation result from the sub image storage unit 410, and outputs the read sub image to the display image generator 416. Meanwhile, the sub image reading unit 412 can read a sub image from the sub image storing unit 410 even when no key manipulation is provided. For example, although no key manipulation by the user occurs, if the battery capacity of the image display and storage device is insufficient, the sub image reading unit 412 reads a sub image which is a sentence "the battery is low" from the sub image storage unit 410, and outputs the read sub image to the sub image generator 416. Also, the sub image reading unit 412 outputs the read sub image to a sub screen memory (not shown) of the photographed image storage unit 120, and the sub screen memory can store the sub image.

The size adjustment unit 414 may process the original image received through the input terminal IN1 so that the size of the original image to be displayed on the display panel is adjusted, generate the corresponding main image, and outputs the main image to the display image generator 416. Here, the input terminal IN1 may be the output terminal OUT3 illustrated in FIG. 3, for example.

The size adjustment unit 414, thus, may consider the size of the sub image that will be displayed on the display panel, corresponding to a user key manipulation. If the display size of the sub image is constant regardless of the content of the sub image, the size adjustment unit 414 may adjust the size of the original image, which will be displayed on the display panel, to a constant size. Meanwhile, if the size of the sub image that will be displayed on the display panel depends on the content of the sub image, the sub image storage unit 410 may store information regarding the "sub images" and information regarding the "sizes of sub images which will be displayed on the display panel" according to key manipulation results. The size adjustment unit 414 reads the information regarding the "sizes of sub images which will be displayed on a display panel" corresponding to a key manipulation result, and generates a main image using the read information. The size adjustment unit 414 may output the main image to a video memory (not shown) of the photographed image storage unit 120, and the video memory may store the main image. Meanwhile, the size adjustment unit 414 can use various interpolation algorithms, such as bi-cubic interpolation, bi-linear interpolation, nearest interpolation, or any other interpolation algorithm.

Accordingly, the display image generator 416 may combine the main image generated by the size adjustment unit 414 with the sub image read by the sub image reader 412 to generate a display image, and output the combined display image to the display unit 110 through an output terminal OUT5, for example. The display size of the main image may depend on the display size of the sub image so that the display image can satisfy the VGA specification, or any other video display standard. In one embodiment, the horizontal/vertical ratio (aspect ratio) of the display image may be 16:9, and an aspect ratio of the main image may be 4:3. Also, the display image generator 416 receives the main image from the video memory and the sub image from the sub screen memory (not shown), and combines the main image with the sub image, thereby generating the display image, noting that embodiments of the present invention are not limited thereto.

The compression unit 418 may compression-encode the original image received through the input terminal IN2, generate a storage image, and output the storage image to the photographed image storage unit 120 through an output terminal OUT6, for example, to store the storage image. Here, in this example, the input terminal IN2 is the output terminal OUT4 illustrated in FIG. 3. Meanwhile, the compression unit 418 may be omitted. In this case, the photographed image storage unit 120 stores the original image received through the input terminal IN2.

Figure 5:
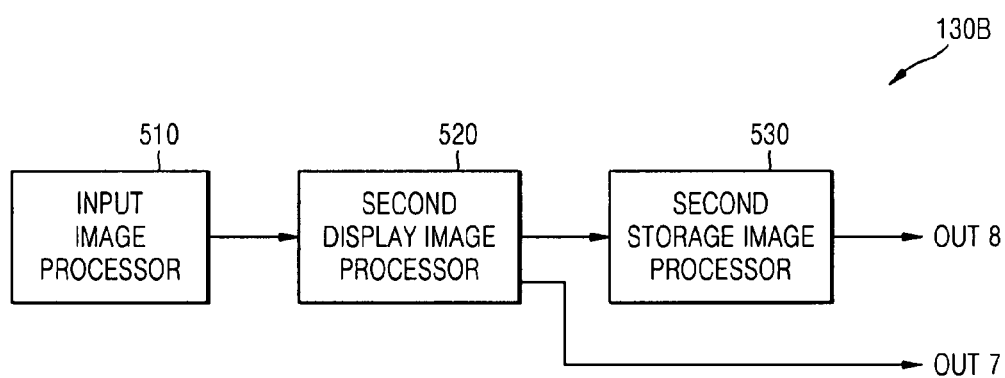
FIG. 5 illustrates an image processing unit, such as illustrated in FIG. 1, according to one or more embodiments of the present invention.

The image display and storage device according to an embodiment of the present invention, may be in a preview mode or a photography mode. If the image display and storage device is in the preview mode, the compression unit 418 and the photographed image storage unit 120 among the display unit 110, through the image processing unit 130, may not operate. Meanwhile, if the image display and storage device is in the photography mode, all of the display unit 110 through the image processing unit 130 may operate FIG. 5 illustrates an image processing unit 130B, such as the image processor unit illustrated in FIG. 1, according to another embodiment of the present invention. Referring to FIG. 5, the image processing unit 130B may include an input image processor 510, a second display image processor 520, and a second storage image processor 530, for example.

Here, the input image processor 510 receives an image, adjusts at least one of the color and the number of pixels of the image, and outputs the adjusted image to the second display image processor 520.

The second display image processor 520 may receive the adjusted image from the input image processor 510, convert an aspect ratio of the adjusted image, generate a main image, combine the main image with a sub image, generate a display image, and output the display image to the display unit 110 through an output terminal OUT7, for example. In this case, the main image of the display image can be displayed on a main display area (not shown) of the display panel, and the sub image of the display image can be displayed on a bottom display area (not shown) of the display panel, noting that embodiments of the present invention are not limited thereto.

Also, the second display image processor 520 may receive the adjusted image from the input image processor 510, generate a thumbnail image of the adjusted image, and output at least one of the thumbnail image and the adjusted image to the second storage image processor 530.

Thereafter, the second storage image processor 530 may receive at least one of the adjusted image and the thumbnail image from the second display image processor 520, compression-encode the at least one of the adjusted image and the thumbnail image, generate a storage image, and output the storage image to the photographed image storage unit 120 through an output terminal OUT8.

Meanwhile, if the image display and storage device is in the preview mode, the input image processor 510, the second display image processor 520, and the display unit 110 may selectively operate. If the image display and storage device is in the photography mode, the input image processor 510, the second display image processor 520, the second storage image processor 530, the display unit 110, and the photographed image storage unit 120 may selectively operate. That is, if the image display and storage device is in the preview mode, an acquired original image may be subjected to aspect ratio conversion and displayed on the display unit 120 without being stored. If the image display and storage device is in the photography mode, an acquired original image may be displayed on the display unit and simultaneously stored in the photography image storage unit 120.

Figure 6:
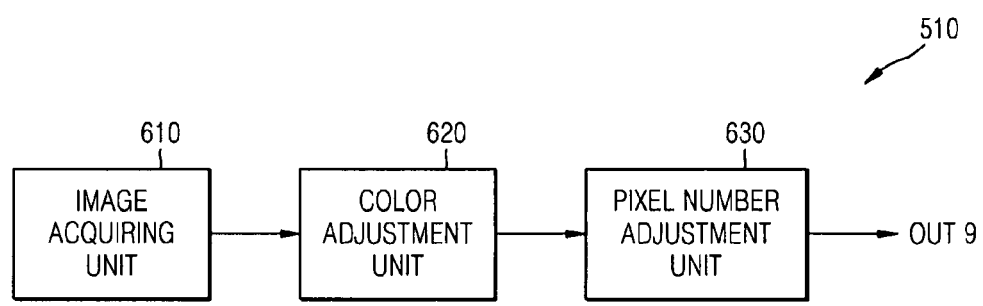
FIG. 6 illustrates an input image processor, such as illustrated in FIG. 5, according to one or more embodiments of the present invention.

FIG. 6 illustrates an input image processor 510 such as that illustrated in FIG. 5. The input image processor 510 may include an image acquirement unit 610, a color adjustment unit 620, and a pixel number adjustment unit 630, for example.

The image acquirement unit 610 may include at least one lens and a sensor for sensing light incident through the lens, with sensor being a photoelectric sensor, such as a CCD, or any other light detecting sensor. Accordingly, the image acquirement unit 610 acquires an original image.

The color adjustment unit 620 adjusts the color of the original image received from the image acquirement unit 610. The color adjustment unit 620 may perform at least one of auto exposure, auto white balance, auto focus, and color processing on the original image, or any other color adjustment procedure. The color adjustment unit 620 may further receive and/or output the original image in a format of a movie stream, although other image formats may be used.

The pixel number adjustment unit 630, thus, adjusts the number of pixels of the original image whose color is adjusted by the color adjustment unit 620, and outputs the adjusted result to the second display image processor 520 through an output terminal OUT9. For example, the pixel number adjustment unit 630 may adjust the original image whose color is adjusted, according to the VGA specification (640*480 pixels; 640 pixels in the horizontal direction and 480 pixels in the vertical direction). Meanwhile, the pixel number adjustment unit 630 may adjust the number of pixels of the original image, whose color is adjusted, according to the operating mode of the image display and storage device. Also, the pixel number adjustment unit 630 may output the result, whose pixel number is adjusted, to the first image memory (not shown) of the photographed image storage unit 120, and the first image memory can store the adjusted result.

Meanwhile, the input image processor 510 may omit at least one of the color adjustment unit 630 and the pixel number adjustment unit 630. Thus, for the convenience of description, in FIGS. 7, 8, and 9, it has been assumed that the input image processor 510 includes neither the color adjustment unit 620 nor the pixel number adjustment unit 630 noting that this is only one embodiment of the present invention. In this case, the image output to the second display image processor 520 through the output terminal OUT9 is the original image.

Figure 7:
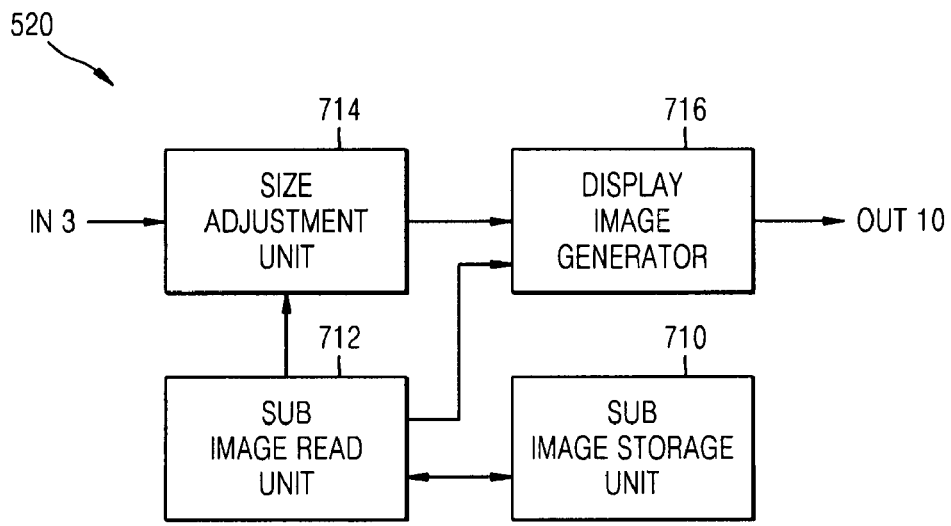
FIG. 7 illustrates a second display image processor, such as illustrated in FIG. 5, according to one or more embodiments of the present invention.

FIG. 7 illustrates a second display image processor 520, such as that illustrated in FIG. 5. Referring to FIG. 7, the second display image processor 520 may includes a sub image storage unit 710, a sub image reading unit 712, a size adjustment unit 714, and a display image storage unit 716, for example.

The sub image storage unit 710 and the sub image reading unit 712 may have the same structures as the sub image storage unit 410 and the sub image reading unit 412 illustrated in FIG. 4, and therefore, a further detailed description thereof will be omitted.

The image display and storage device according to another embodiment of the present invention can have a preview mode and a photography mode, for example.

Regardless of whether the image display and storage device is in the preview mode or in the photography mode, the size adjustment unit 714 may process an original image received through the input terminal IN3 so that a size of the original image, which will be displayed on a display panel, is adjusted, generate a main image, and output the main image to the display image generator 716. The size adjustment unit 714, may preferably, consider the size of a sub image read in correspondence to a key manipulation result, which will be displayed on the display panel. If the display size of a sub image is constant regardless of the content of the sub image, the size adjustment unit 714 may adjust the size of the original image that will be displayed on the display panel, to a constant size. Meanwhile, if the size of the sub image that will be displayed on the display panel depends on the content of the sub image, the sub image storage unit 710 may store information regarding "sub images" and information regarding the "sizes of sub images which will be displayed on a display panel" according to key manipulation results. The size adjustment unit 714 reads the information regarding "the sizes of sub images which will be displayed on a display panel" corresponding to a key manipulation result, and generates a main image using the read information.

Meanwhile, when the image display and storage device is in the photography mode, that is, when a user directs the image display and storage device to photograph an image, the size adjustment unit 714 may generate a thumbnail image of an original image received through the input terminal IN3 and output at least one of the thumbnail image and the original image.

The size adjustment unit 714 may output the main image, the thumbnail image, and the original image to the video memory (not shown) of the photographed image storage unit 120. The video memory can then store the main image, the thumbnail image, and the original image. Likewise, the size adjustment unit 714 outputs the original image to a second image memory (not shown) of the photographed image storage unit 120, and the second image memory can store the original image. Also, the size adjustment unit 714 can use various interpolation algorithms, such as bi-cubic interpolation, bi-linear interpolation, nearest interpolation, or any other interpolation technique.

Regardless of whether the image display and storage device is in the preview mode or in the photography mode, the display image generator 716 may combine the main image generated by the size adjustment unit 714 with the sub image read from the sub image reading unit 712, may generate a display image, and may output the display image to the display unit 110 through an output terminal OUT10, for example. The display image generator 716 may not operate when the image display and storage device is in the photography mode, however, the present invention is not limited to this. Also, the display image generator 716 receives the main image from the video memory, receives a sub image from the sub screen memory, combines the main image with the sub image, and generates a display image, again, noting again that the embodiment and the present invention are not limited thereto.

Referring to FIGS. 1 and 7, first, if the image display and storage device operates in the preview mode, the size adjustment unit 714 may generate a main image, and the video memory in the photographed image storage unit 120 stores the main image. Thereafter, the controller 140 may direct the display image generator 716 to generate a display image using the main image and the sub image, and direct the display unit 110 to display the display image.

Further, when the image display and storage device operates in the photography mode, the size adjustment unit 714 may generate a main image, and the photography image storage unit 120 stores at least one of an original image and a thumbnail image. The size adjustment unit 714 and the photographed image storage unit 120 may also operate under the control of the controller 140.

Figure 8:
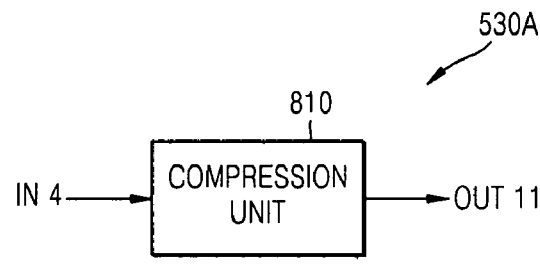
FIG. 8 illustrates a second storage image processor, such as illustrated in FIG. 5, according to one or more embodiments of the present invention.

FIG. 8 illustrates a second storage image processor 530A, such as that illustrated in FIG. 5, according to one or more embodiments of the present invention. Referring to FIG. 8, the second storage image processor 530A at least further includes a compression unit 810.

If the compression unit 810 included in the second storage image processor 530 is activated by the controller 140, the compression unit 810 may receive at least one of the thumbnail image and the original image from the second display image processor 520 through an input terminal IN4, compression-encode the at least one of the thumbnail image and the original image, generate a storage image, and output the storage image to the photographed image storage unit 120 through an output terminal OUT11. Here, the compression unit 810 may read the thumbnail image and the original image from independent memories, respectively, however, the present invention is not limited to this.

Figure 9:
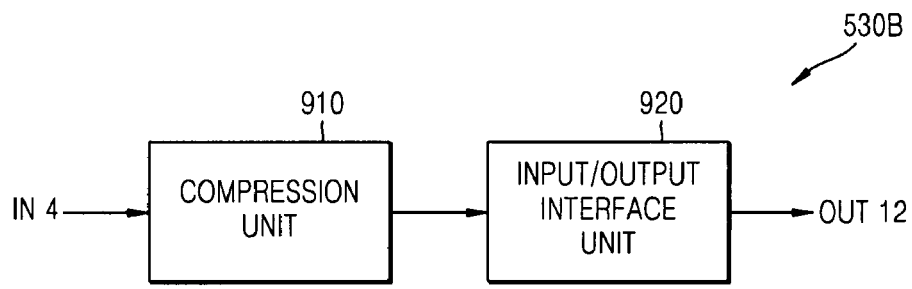
FIG. 9 illustrates another second storage image processor, according to one or more embodiments of the present invention.

FIG. 9 illustrates another second storage image processor 530B, such as that illustrated in FIG. 5, according to another embodiment of the present invention. Referring to FIG. 9, the second storage image processor 530B may further include a compression unit 910 and an input/output interface unit 920, for example.

If the compression unit 910 included in the second storage image processor 530B is activated by the controller 140, for example, the compression unit 910 may receive at least one of a thumbnail image and an original image from the second display image processor 520 through an input terminal IN4, compression-encode the at least one of the thumbnail image and the original image, generate a storage image, and output the storage image to an input/output interface 920. Here, the compression unit 910 may read the thumbnail image and the original image from independent memories, respectively, however, the present invention is not limited thereto. In one embodiment, the original image may be an image based on the QVGA specification (320*240 pixels; 320 pixels in the horizontal direction and 240 pixels in the vertical direction), noting again that the present invention is not limited thereto.

In addition, the input/output interface 920, included in the second storage image processor 530B, may receive the storage image from the compression unit 910 and transfer the storage image to an external personal computer (PC). In this embodiment, input/output interface 920 may transfer the storage image in a format of a 30 fps (frames per second) QVGA stream, however, the present invention is not limited to this.

In an interfacing operation, first when the image display and storage device are connected to an external PC, or other computing device, through an input/output interface 920 (for example, a Universal Serial Bus (USB) interface), the size adjustment unit 714 may store an image whose ratio is converted into an aspect ratio of an image photographed by a camcorder of the PC, in an image memory (not shown) in the photographed image storage unit 120. The compression unit 910 compression-encodes the stored image, and the input/output interface 920 outputs the compression-encoded image to the PC through an output terminal OUT12.

Figure 10A:
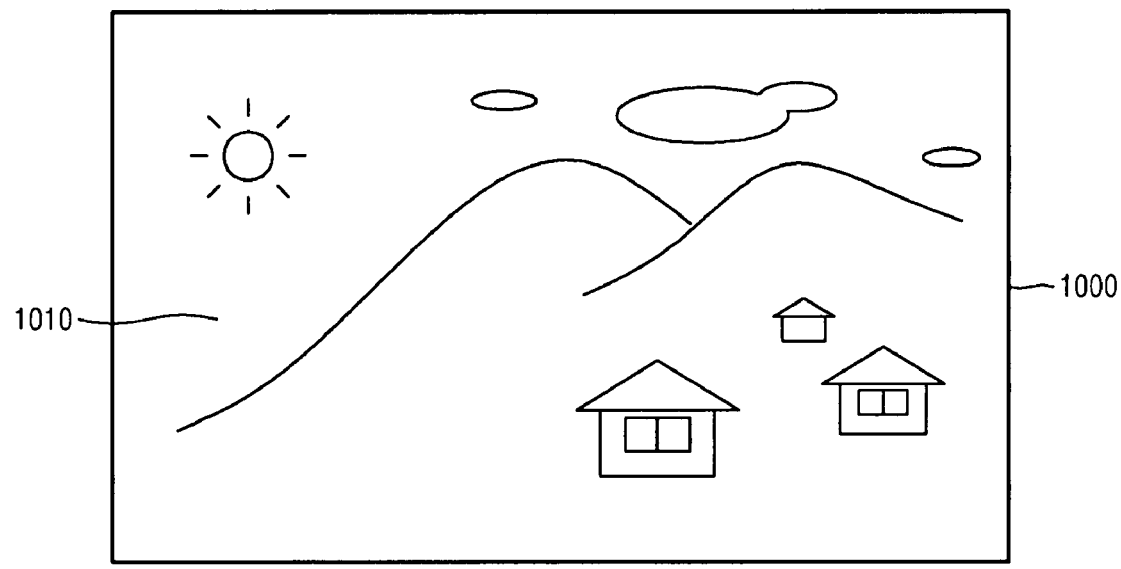
FIGS. 10A and 10B illustrate a display panel, an original image, a main image, and a sub image, according to one or more embodiments of the present invention.
Figure 10B:
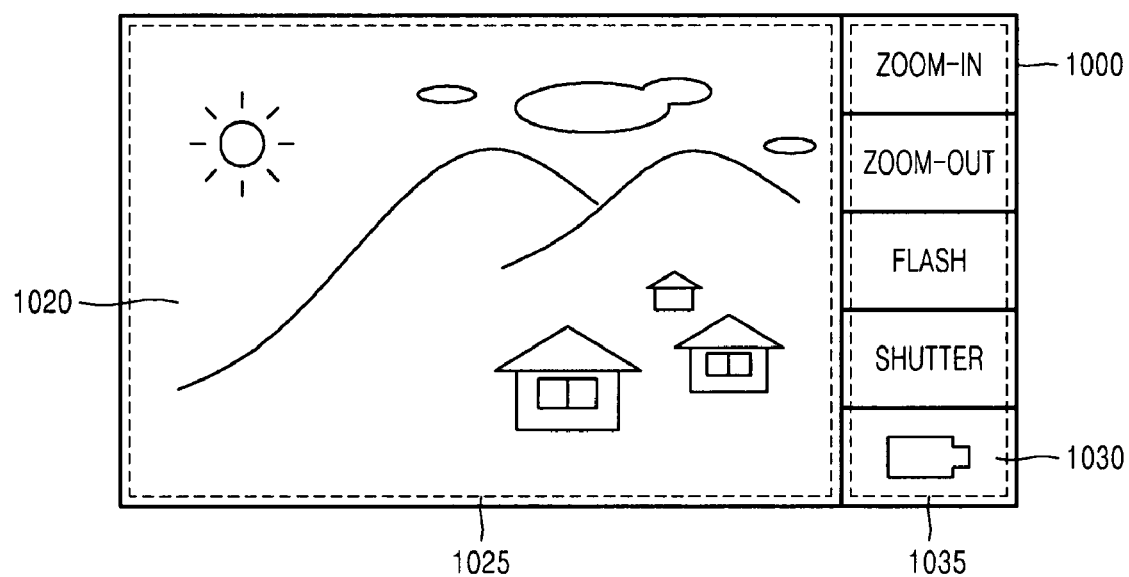

FIGS. 10A and 10B illustrate examples of the aforementioned display panel, the original image, the main image, and the sub image. In detail, FIG. 10A illustrates an example of an original image 1010 displayed on a display panel 1000, and FIG. 10B illustrates an example of a main image displayed on a portion 1025 of the display panel 1000 and a sub image 1030 displayed on a different portion 1035 of the display panel 1000.

As illustrated in FIGS. 10A-10B, the sub image 1030 includes a symbol for setting zoom-in or zoom-out, a symbol for setting on/off of a flash, a symbol for setting a degree of opening and closing of a shutter, and a figure for indicating battery capacity, although any operational, or other feature of the device may be included.

Figure 11:
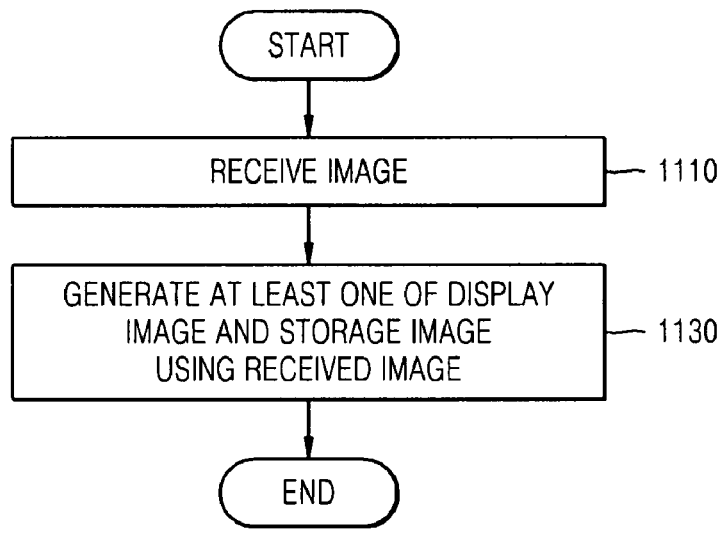
FIG. 11 illustrates an image display and storage method, according to one or more embodiments of the present invention.

FIG. 11 illustrates an image display and storage method, according to one or more embodiments of the present invention.

Referring to FIGS. 1 and 11, an image may be received, in operation 1110, for example, the image processor 130 may receive the image under the control of the controller 140. Here, the received image may include a moving picture, a still picture, or any other type of image.

Thereafter at least one of a display image and a storage image may be generated, for example, by the image processor 130, using the received image. The storage image may be stored, for example, in the photographed image storage unit 120, and the display image may be displayed, for example, on the display 110, in operation 1120.

Figure 12:
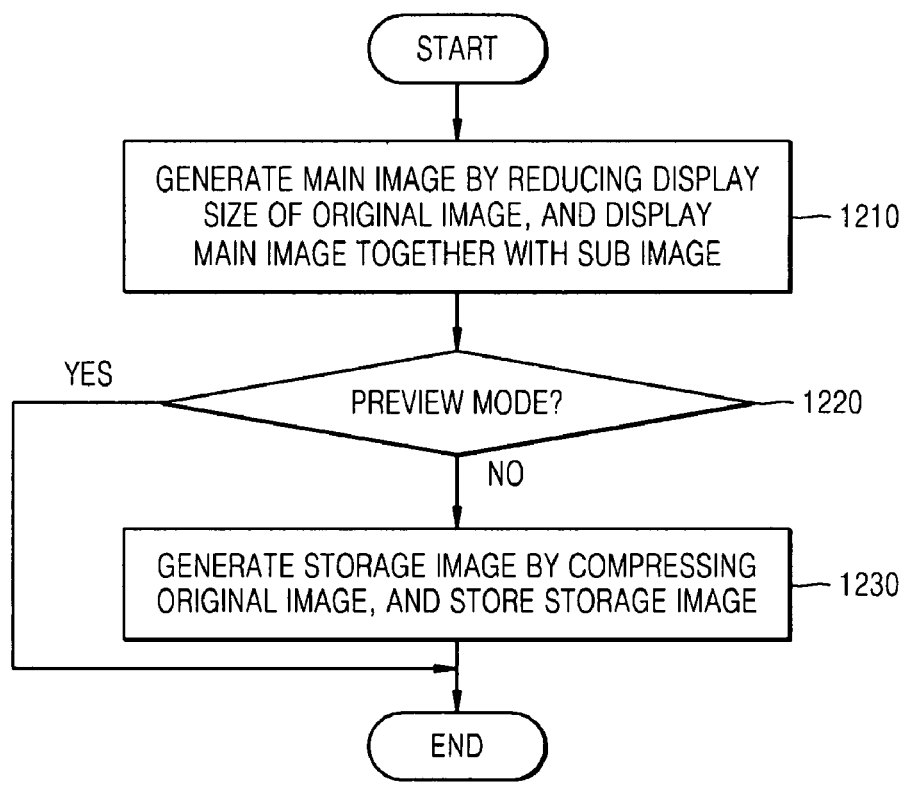
FIG. 12 illustrates another image display and storage method, according to one or more embodiments of the present invention.

FIG. 12 illustrates an image display and storage method, according to one or more embodiments of the present invention. The image display and storage method includes processing an original image so that the original image and a sub image do not overlap, and generating a main image. Then, when the main image and the sub image are displayed, storing the original image instead of the main image, (See illustrated operations 1210 through 1230).

Referring to FIGS. 1 and 12, an original image may be processed so that a display size of the original image is reduced, and a main image may be generated, for example, by image processor 130, and the main image and a sub image may be displayed, for example, by display unit 110, in operation 1210.

After operation 1210, whether the image display and storage device is in a preview mode or in a photography mode may be determined, for example, by controller 140, in operation 1220.

If it is determined that the image display and storage device is in the photography mode, the original image may be compressed and a storage image generated, for example, by the image processor 130, and the storage image may be stored, for example, by storage unit 120, in operation 1230. Meanwhile, if it is determined that the image display and storage device is in the preview mode, operation 1230 may be omitted.

In more detail, using this embodiment only as an example, first, the image processor 130 receives an image, and converts the image into a predetermined size (size conversion). If the image is a moving picture, the image processor 130 can convert the moving picture on the basis of the VGA specification, or any other video display standard. If the image is a still picture, the image processor 130 can convert the still picture into the number of pixels (for example, 5 mega pixels) as designated by a user. However, the present invention is not limited to this.

Thereafter, the controller 140 determines whether a mode selected by a user is a preview mode, for example. In the exemplary embodiments discussed herein, a preview mode and a photography mode are illustrated, however, the present invention is not limited to these.

If the mode selected by the user is the preview mode, the image processor 130 converts an aspect ratio of the image subjected to size conversion, generates a main image, combines the main image with a sub image, generates a display image, and outputs the display image to the display unit 110.

Meanwhile, if the mode selected by the user is the photography mode, the image processor 130 compression-encodes the image subjected to size conversion, generates a storage image, converts an aspect ratio of the image subjected to size conversion, generates a main image, combines the main image with a sub image, and generates a display image. The storage image is stored in the photographed image storage unit 120.

The image processor 130 receives the image converted based on the VGA specification, converts an aspect ratio of the converted image, and generates a main image. The image converted based on the VGA specification can be stored in the first image memory of the photographed image soaring unit 120.

Thereafter, the image processor 130 reads the sub image. The read sub image can be stored in the sub screen memory of the photographed image storing unit 120.

Then, the image processing unit 130 combines the main image with the sub image and generates a display image. The conversion ratio of the main image may be decided according to the size of the sub image so that the display image is based on the VGA specification or an arbitrary standard. However, the present invention is not limited to this. Also, the image processor 130 receives the main image from the video memory, and receives the sub image from the sub screen memory, under the control of the controller 140, however, the present invention is not limited to this.

Figure 13:
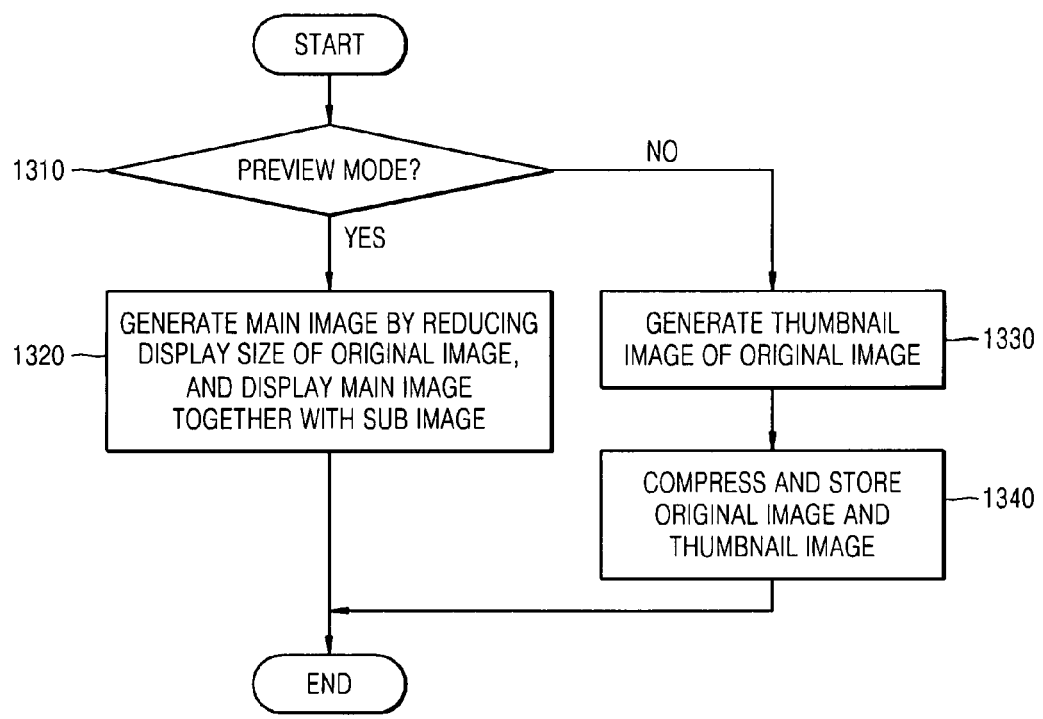
FIG. 13 illustrates still another image display and storage method, according to one or more embodiments of the present invention.

FIG. 13 illustrates an image display and storage method, according to another embodiment of the present invention. The image display storage method includes processing an original image so that the original image and a sub image do not overlap, and generating a main image. Then, when the main image and the sub image are displayed, the original image may be stored instead of the main image. See operations 1310 through 1340 of FIG. 13.

Referring to FIGS. 1 and 13, the controller 140 determines whether the image display and storage device are in a preview mode or in a photography mode may be determined, for example, by controller 140, in operation 1310.

If it is determined that the image display and storage device are in the preview mode, the original image may be processed so that the size of the original image is reduced and a main image generated, for example, by image processor 1310, the main image with the sub image, may be displayed, fore example, by display unit 110, in operation 1320.

If it is determined that the image display and storage device are in the photography mode, the image processor 130 generates a thumbnail image of the original image, may be generated, for example, by image processor 130, in operation 1330. After operation 1330, the image the original image and the thumbnail image may be processed and a storage image generated, for example, by image processor 130, and the storage image stored, for example, by the photography image storage unit 120 in operation 1340.

If the image display and storage device is in the photography mode, operation 1320 may be performed in another manner, for example, as follows, noting that this is only one of many available embodiments.

First, the image processor 130 may receive an image and converts the image into a predetermined size (size conversion). If the received image is a moving picture, the moving picture may be converted based on the VGA specification, although any video display standard may be used. If the received image is a still picture, the still picture may be converted into the number of pixels (for example, 5 mega pixels) designated by a user. However, the present invention is not limited to this.

Then, the image processor 130 may convert an aspect ratio of the image subjected to size conversion, and generate a main image or a thumbnail image of the original image. In this case, the video memory of the photographed image storing unit 120 may store at least one of the main image, the original image, and the thumbnail image. Particularly, the original image can be stored in the second image memory.

Thereafter, the controller 140 may determine whether a mode selected by a user is a preview mode. In this embodiment, though a preview mode and a photography mode are illustrated, alternate embodiment and the present invention is not limited to only these two modes.

Regardless, the mode selected by the user is the preview mode, the image processor 130 may generate a main image, combine the main image with a sub image, generates a display image, and output the display image to the display unit 110.

If the mode selected by the user, etc. is the photography mode, the image processor 130 may compression-encode at least one of the original image and the thumbnail image, and generate a storage image. Then, the image processor 130 may convert an aspect ratio of the original image, generate a main image, combine the main image with the sub image, and generate a display image. The storage image may be stored in the photography image storage unit 120.

In addition to this discussion, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, in an image display and storage device, method, and medium, according to an embodiment of the present invention, by reducing a display size of an image shown through a lens, the image shown through the lens and an image for allowing a user to manipulate a terminal are displayed without overlapping. In addition, although a size of an image shown through a lens is reduced, a non-distorted image may be captured and stored. Furthermore since a thumbnail image of an original image can be stored, a user can easily search for a specific image among images photographed by him or her.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. An image display and storage device comprising:
    an image processor to receive an image and to generate a display image and a storage image using the received image, an image characteristic of the display image being different than an image characteristic of the storage image;
    a display unit to receive the display image from the image processor, and to display the display image; and
    an image storing unit to receive the storage image from the image processor and to store the storage image; and
    a controller to control the image processor to generate the display image in a preview mode and to generate the display image and the storage image in a photography mode.

2. The image display and storage device of claim 1, wherein the image processor comprises:
    a first display image processor, to generate a main image by converting an aspect ratio of the received image and to combine the main image with a sub image to generate the display image; and
    a first storage image processor to compress the received image, thereby generating the storage image.

3. The image display and storage device of claim 2, wherein the input image processor comprises:
    an image acquiring unit to acquire an image;
    a color adjustment unit to process the acquired image by performing at least one of auto exposure, auto white balance, and auto focus on the acquired image; and
    a pixel number adjustment unit to convert the processed image from the color adjustment unit according to a video display standard.

4. The image display and storage device of claim 2, wherein the display unit includes a main display area for displaying the main image and a button display area for displaying the sub image.

5. The image display and storage device of claim 3, wherein the first display image processor comprises:
    a size adjustment unit to generate the main image by converting an aspect ratio of the converted image from the pixel number adjustment unit; and
    a display image generator to combine the main image with the sub image and to generate the display image,
    wherein the aspect ratio of the main image depends on a size of the sub image so that the display image is based on the video display standard.

6. The image display and storage device of claim 1, wherein the image processor comprises:
    an input image processor to adjust at least one of a color and the number of pixels of the input image;
    a second display image processor to generate a main image by converting an aspect ratio of the adjusted image, to generate a thumbnail image of the adjusted image, to output at least one of the thumbnail image and the adjusted image and to generate the display image by combining the main image with the sub image; and
    a second storage image processor to generate the storage image by compressing at least one of the thumbnail image and the adjusted image.

7. The image display and storage device of claim 6, further comprising a controller to selectively activate the second display image processor and the second storage image processor based on whether the image display and storage device is in at least one of a preview mode and a photography mode.

8. The image display and storage device of claim 6, wherein the input image processor comprises:
    an image acquiring unit to acquire an image;
    a color adjustment unit to process the acquired image by performing at least one of auto exposure, auto white balance, auto focus on the acquired image; and
    a pixel number adjustment unit to convert the number of pixels of the processed image, from the color adjustment unit, into a predetermined number of pixels.

9. The image display and storage device of claim 6, wherein the display unit includes a main display area for displaying the main image and a button display area for displaying the sub image.

10. The image display and storage device of claim 8, wherein the second display image processor comprises:
    a size adjustment unit to generate the main image by converting an aspect ratio of the adjusted image from the pixel number adjustment unit, and to output the main image, when the image display and storage device is in the preview mode, and to generate a thumbnail image of the adjusted image, and to output the thumbnail image and the adjusted image when the image display and storage device is in the photography mode; and
    a display image generator to combine the main image with the sub image and to generate the display image.

11. The image display and storage device of claim 6, wherein the second storage image processor comprises:
    a compression unit to generate the storage image by compressing the adjusted image and the thumbnail image; and
    an input/output interface to transfer the storage image to the outside.

12. The image display and storage device of claim 1, wherein the image processor comprises:
    an input image processor to adjust at least one of a color and the number of pixels of the received image, as an adjusted image;
    a first display image processor, to generate a main image by converting an aspect ratio of the adjusted image and to combine the main image with a sub image to generate the display image; and
    a first storage image processor to compress the adjusted image, thereby generating the storage image.

13. An image display and storage device comprising:
    an image processor to generate a main image to be displayed without overlapping a sub image by processing an original image which would otherwise overlap the sub image when displayed, the original image having an image characteristic that is different than an image characteristic of the main image;
    a display unit to display the main image and the sub image together; and
    a photographed image storing unit to store the original image,
    wherein the image processor comprises:
    a size adjustment unit to generate the main image by processing the original image so that a display size of the original image is reduced; and a display image generator to combine the main image with the sub image and to output the combined main image and sub image to the display unit.

14. The image display and storage device of claim 13, wherein the image processor further comprises a compression unit to compress the original image and output the compressed original image to the photographed image storage unit.

15. The image display and storage device of claim 13, wherein the image processor generates a thumbnail image of the original image and the main image, and the photographed image storage unit stores the original image and the thumbnail image.

16. The image display and storage device of claim 13, wherein the display unit and the photographed image storage unit operate according to an operation mode of the image display and storage device.

17. The image display and storage device of claim 13, wherein the display unit includes a display panel, the main image is displayed on only a portion of the display panel, and the sub image is displayed on a different portion of the display panel, as the display portion of the main image.

18. A display and storage method performed by a terminal, comprising:
   generating, by way of a processor, a display image and a storage image based on an original image according to whether the terminal is in a preview mode or not, the display image and the storage image being generated with a different image characteristic; and
   selectively displaying and storing the display image and the storage image, respectively.

19. The image display and storage method of claim 18, wherein the generating of the display image and storage image comprises:
   adjusting at least one of a color and the number of pixels of the an original image, as an adjusted image;
   determining whether the terminal is in a preview mode;
   if the terminal is in the preview mode, generating a main image by converting an aspect ratio of the adjusted image, and generating the display image by combining the main image with a sub image.

20. The image display and storage method of claim 19, wherein the generating of the display image and storage image further comprises, if the terminal is not in the preview mode, generating the storage image by compressing the adjusted image.

21. The image display and storage method of claim 19, wherein the generating of the main image and generating of the display image comprises:
   receiving an image converted according to a video display standard, generating the main image by converting an aspect ratio of the converted image; and
   wherein the aspect ratio of the main image depends on a size of the sub image so that the display image satisfies the video display standard.

22. The image display and storage method of claim 18, wherein the generating comprises:
   inputting an image and adjusting at least one of a color and the number of pixels of the input image;
   generating at least one of a thumbnail image of the adjusted image and a main image generated by converting an aspect ratio of the adjusted image;
   determining whether the terminal is in a preview mode; and
   generating a display image by combining the main image with a sub image when the terminal is in the preview mode.

23. The image display and storage method of claim 22, wherein the generating further comprises, generating the storage image by compressing at least one of the adjusted image and the thumbnail image when the terminal is not in the preview mode.

24. The image display and storage method of claim 22, wherein the generating a display image comprises:
   receiving an image converted according to a video display standard, generating a main image by converting an aspect ratio of the converted image; and
   receiving the main image, and generating the display image by combining the main image with the sub image, wherein the aspect ratio of the main image depends on a size of the sub image so that the display image satisfies the video display standard.

25. An image display and storage method comprising:
   generating, by way of a processor, a main image to be displayed without overlapping a sub image by processing an original image which would otherwise overlap the sub-image when displayed, the original image having an image characteristic that is different than an image characteristic of the main image;
   displaying the main image and the sub image together without overlap; and
   storing the original image,
   wherein the main image is generated by processing the original image so that a display size of the original image is reduced.

26. At least one medium comprising computer readable code to control at least one processing element to implement the display and storage method of claim 25.

27. An image display and storage method performed by a terminal, comprising:
   generating, by way of a processor, a main image which is displayed without overlapping a sub image by processing an original image which is capable of overlapping the sub image, the original image having an image characteristic that is different than an image characteristic of the main image;
   displaying the main image and the sub image together;
   determining whether the terminal is in a photography mode; and
   selectively storing the original image based on the terminal being in a photography mode,
   wherein the main image is generated by processing the original image so that a display size of the original image is reduced.

28. The image display and storage method performed by a terminal of claim 27, wherein the processing comprises altering an image characteristic of an original image.

29. The image display and storage method performed by a terminal of claim 28, wherein the image characteristic is an aspect ratio.

30. An image display and storage method performed by a terminal, comprising:
   determining whether the terminal is in one of a preview mode and a photography mode;
   generating a main image which is to be displayed without overlapping a sub image by processing an original image which would otherwise overlap the sub image when displayed, based on the terminal being in a preview mode;
   generating a thumbnail image of the original image;
   storing the thumbnail image and the original image based on the terminal being in a photography mode, wherein the main image is generated by processing the original image so that a display size of the original image is reduced.

31. An image display and storage device comprising:
an image processor to generate a display image and a storage image from an original image, the display image and the storage image being generated with a different image characteristic;
a display unit to display the display image; and
an image storing unit to store the storage image; and
a controller to control the image processor to generate the display image in a preview mode and to generate the display image and the storage image in a photography mode.

32. The image display and storage device of claim 31, wherein the image characteristic is an aspect ratio.

* * * * *

UNITED STATES PATENT AND TRADEMARK OFFICE
CERTIFICATE OF CORRECTION

PATENT NO. : 7,821,523 B2
APPLICATION NO. : 11/706987
DATED : October 26, 2010
INVENTOR(S) : Byung-in Yoo et al.

It is certified that error appears in the above-identified patent and that said Letters Patent is hereby corrected as shown below:

Column 18, Line 30 in Claim 26, before "medium" insert -- non-transitory --.

Signed and Sealed this
Eighth Day of February, 2011

David J. Kappos
*Director of the United States Patent and Trademark Office*